UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

ARTICLE AND PROCESS OF BONDING METAL AND VULCANIZED RUBBER.

1,349,912.  Specification of Letters Patent.  Patented Aug. 17, 1920.

No Drawing.   Application filed May 5, 1920.  Serial No. 378,941.

*To all whom it may concern:*

Be it known that I, WILLIAM BEACH PRATT, a citizen of the United States, residing at Wellesley, in the county of Norfolk and State of Massachusetts, have invented new and useful Improvements in Articles and Processes of Bonding Metal and Vulcanized Rubber, of which the following is a specification.

This invention has for its object to provide a process of bonding together vulcanized rubber and those metals to which a rubber compound does not readily adhere in the process of vulcanization—such, for example, as metals of the iron group.

I have found that if the surface of such a metal is first coated with a non-colloidal sulfur terpene compound, and a body of rubber and sulfur compound (with or without compounding materials, *e. g.*, litharge, zinc oxid, etc.) is placed contiguously to such coated surface, and the rubber vulcanized *in situ*, the interposed coating causes the vulcanized rubber to be firmly bonded or joined to the metal, so that it can be separated therefrom only with considerable difficulty. In lieu of using a rubber compound alone, it may constitute the frictioned side or face of a fibrous material containing or impregnated with such non-colloidal sulfur terpene compound.

A suitable non-colloidal sulfur terpene compound may be prepared by digesting oil of turpentine (2 parts by weight) and sulfur (1½ to 2 parts) in a reflux condenser at a temperature of 140° C. and above, preferably until hydrogen sulfid is liberated. The reaction is progressive and may be continued until the product on cooling to ordinary temperatures is a semisolid or a solid as desired.

This product may be applied when melted to the surface of an iron or steel article (*e. g.*, the inner or outer surfaces of a tank or other structure) or it may be dissolved in toluol or xylol and the solution applied. In either case after the compound has cooled or the solvent has evaporated therefrom, the body of rubber compound (*i. e.*, vulcanizable rubber compounded with sulfur and such suitable compounding materials as desired) is brought into contact with the coated surface, and by a suitable vulcanizing apparatus the rubber compound is vulcanized under proper conditions of heat or heat and pressure, whereupon the vulcanized rubber is through the intermediary of the intervening layer of non-colloidal sulfur compound, firmly bonded or joined to the metal. The sulfur-terpene compound reacts chemically with the rubber-sulfur compound and becomes vulcanized therewith, and, while I am unable to account satisfactorily to myself for the surprisingly firm bonding of these two materials to the metal surface, since rubber, in vulcanizing, ordinarily does not adhere to an iron or steel surface, I have formed a theory which possibly may account therefor. That is, I have concluded that the sulfur-terpene compound in contact with the iron, excludes the possibility of surface oxidation, and that the sulfur terpene compound interacts with the iron to form a sulfur iron compound, which not only furnishes a protective coating on the iron surface, but also acts as a bond between the iron and the sulfur-rubber compound.

Instead of employing a layer or body of rubber to be bonded to the metal surface, I may substitute therefor a body or layer of fibrous material treated or impregnated with the non-colloidal sulfur terpene compound, or else such a layer mechanically frictioned on its inner face with a crude rubber and sulfur compound. In either such case the structure is subjected to pressure and to a temperature such as would be employed in a rubber-vulcanizing process. In fact, if desirable, the said fabric may be interposed between the coated metal and a body of rubber compound, and the whole vulcanized together to effect a firm and durable bond, joint or connection between the resulting vulcanized rubber body and the metal member.

On the other hand, instead of applying the compound to the metal surface, the fabric after being treated with a liberal quantity of the compound, may be laid on the metal, and the product vulcanized as described.

What I claim is:

1. The herein described method of bonding vulcanized rubber and metal which comprises coating the surface of the metal with a non-colloidal sulfur terpene compound, placing thereagainst a material to be bonded to such surface and subjecting the structure to heat and pressure.

2. The herein described method of bonding vulcanized rubber and metal which comprises coating the surface of the metal with a non-colloidal sulfur terpene compound, placing thereagainst a layer of rubber compound capable of vulcanization and then vulcanizing the rubber *in situ*.

3. The herein described method of bonding vulcanized rubber and metal which comprises coating the surface of the metal with a non-colloidal sulfur terpene compound, placing thereagainst a fibrous body treated with such non-colloidal sulfur terpene compound and frictioned on its contacting face with a rubber compound capable of vulcanization, and then subjecting the structure to heat and pressure to vulcanize the rubber.

4. The herein described method of bonding vulcanized rubber and metal which comprises coating the surface of the metal with a non-colloidal sulfur terpene compound, placing thereagainst a fibrous body treated with such non-colloidal sulfur terpene compound and frictioned on its contacting face with a rubber compound capable of vulcanization, then placing a body of vulcanizable rubber on the other face of such fabric, and finally subjecting the structure to a vulcanizing temperature under pressure.

5. The herein described method which comprises bringing into surface contact, a metal, a non-colloidal sulfur terpene compound, and a material to be bonded to the metal, and then subjecting the same to heat and pressure.

6. The herein described process which comprises bringing into contactual relation a metal body and a fibrous material impregnated with a non-colloidal sulfur terpene compound, and subjecting the same to heat and pressure.

7. The herein described process which comprises bringing into contactual relation a metal body, a non-colloidal sulfur terpene compound, and a material to be bonded to the metal body, and subjecting the same to heat and pressure.

8. A new manufacture comprising a metal body, a fibrous body having its fibers treated with a non-colloidal sulfur terpene compound, and a rubber body, all vulcanized and thereby bonded together.

9. A new manufacture comprising an iron body, a rubber body, and an intervening non-colloidal sulfur terpene compound, all vulcanized and bonded together.

In testimony whereof I have affixed my signature.

WILLIAM BEACH PRATT.